United States Patent
Desai et al.

(10) Patent No.: US 10,140,369 B2
(45) Date of Patent: Nov. 27, 2018

(54) COMPUTER IMPLEMENTED SYSTEM AND METHOD FOR COLLATING AND PRESENTING MULTI-FORMAT INFORMATION

(71) Applicant: VF Worldwide Holdings Ltd., Dubai (AE)

(72) Inventors: Falguni Jignesh Desai, Mumbai (IN); Vishwas Mukund Pathak, Thane (IN); Bharat Chamanlal Bhardwaj, Thane west (IN)

(73) Assignee: VF Worldwide Holdings Limited, Dubai (AE)

( * ) Notice: Subject to any disclaimer, the term of this patent is extended or adjusted under 35 U.S.C. 154(b) by 261 days.

(21) Appl. No.: 15/022,058

(22) PCT Filed: Jun. 24, 2015

(86) PCT No.: PCT/IB2015/054734
§ 371 (c)(1),
(2) Date: Mar. 15, 2016

(87) PCT Pub. No.: WO2016/001797
PCT Pub. Date: Jan. 7, 2016

(65) Prior Publication Data
US 2016/0224668 A1    Aug. 4, 2016

(30) Foreign Application Priority Data
Jul. 1, 2014   (IN) .......................... 2128/MUM/2014

(51) Int. Cl.
*G06F 17/30*   (2006.01)
*G06F 21/32*   (2013.01)
*G06Q 10/10*   (2012.01)

(52) U.S. Cl.
CPC .. *G06F 17/30864* (2013.01); *G06F 17/30005* (2013.01); *G06F 17/3005* (2013.01);
(Continued)

(58) Field of Classification Search
CPC ... G06Q 10/10; G06F 21/32; G06F 17/30864; G06F 17/30867; G06F 17/278; G06F 17/30005; G06F 17/3005
(Continued)

(56) References Cited

U.S. PATENT DOCUMENTS 6,411,974 B1    6/2002 Graham
2001/0047347 A1*  11/2001 Perell ................... G06F 21/645
(Continued)

FOREIGN PATENT DOCUMENTS

WO    02054171    7/2002

*Primary Examiner* — Dangelino N Gortayo
(74) *Attorney, Agent, or Firm* — Blueshift IP, LLC; Robert Plotkin

(57) ABSTRACT

A computer implemented system for collating and presenting multi-format information in a user-desired format is envisaged. The system stores information related to clients along with additional their personal information in a transient repository. These stored items of information are usually in different formats, including text format, image format and video format, which are then converted by the system into a format desired by the user of the system or into a pre-defined format. An input module present in the system accepts form a user, a desired output information format type and a client identifier corresponding to the client whose information needs to be collated. Based on the client identifier, the system converts the stored client related information in the desired format and then collates and displays the converted information for further processing.

20 Claims, 2 Drawing Sheets

Figure 1:
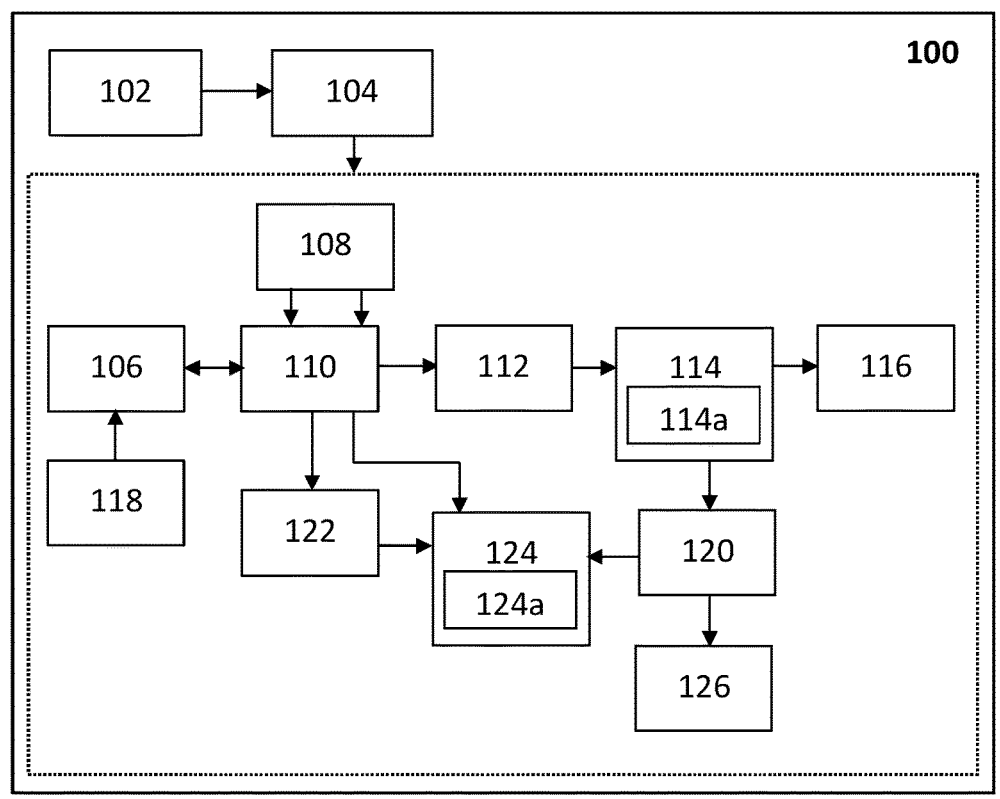

(52) U.S. Cl.
CPC .. *G06F 17/30129* (2013.01); *G06F 17/30312* (2013.01); *G06F 17/30705* (2013.01); *G06F 17/30867* (2013.01); *G06F 21/32* (2013.01); *G06Q 10/10* (2013.01)

(58) Field of Classification Search
USPC ................ 707/709, 770, 690, 708, 727, 731
See application file for complete search history.

(56) References Cited

U.S. PATENT DOCUMENTS

| | | | | |
|---|---|---|---|---|
| 2007/0178501 | A1* | 8/2007 | Rabinowitz | G06Q 50/22 435/6.16 |
| 2008/0168062 | A1* | 7/2008 | Reeves | G07C 9/00087 |
| 2010/0179824 | A1* | 7/2010 | Fujimoto | G06Q 10/087 705/2 |
| 2012/0109882 | A1* | 5/2012 | Bouse | G06Q 10/10 707/607 |
| 2013/0046771 | A1* | 2/2013 | Moitra | G06F 17/30705 707/749 |
| 2014/0244309 | A1* | 8/2014 | Francois | G06Q 10/10 705/3 |
| 2015/0088922 | A1* | 3/2015 | Huh | G06Q 50/10 707/769 |
| 2015/0324527 | A1* | 11/2015 | Siegel | G06F 19/28 705/3 |

\* cited by examiner

COMPUTER IMPLEMENTED SYSTEM AND METHOD FOR COLLATING AND PRESENTING MULTI-FORMAT INFORMATION

FIELD OF DISCLOSURE

The present disclosure relates to the field of assembling and presenting information having different formats.

BACKGROUND

A typical work environment comprises one or more computers containing multiple applications. These applications tend to create and/or store documents/information in various file formats. Convertors that are available today enable an application module to convert a file from a foreign format into a format recognized by the application module. In recent years an end-user's desire of achieving a single view of data across applications has instigated the practice of content collation. There are numerous applications which convert the applicant data view in the form of reports, but there is a requirement of an application which provides single view of applicant data across multiple systems, formats and locations.

Many convertors available today allow an application module to convert a file from a foreign format into a format recognized by the application module. In a case when the convertor is not able to recognize a foreign file format, the user is prompted to manually identify the format or terminate the process of conversion. Additionally, it can be difficult to convert certain foreign/native file formats because of their inherent design.

Also, if the end-user desires to convert files having different formats in one common format, it is mandatory to use multiple different conversion tools for each of the file formats that need conversion. Once such conversion is complete, additional efforts are required to gather all the converted files at a user-desired location and only then can the end-user take further actions.

Therefore, in order to limit the drawbacks of the aforementioned time-consuming process of file format conversion and collation of data, a need exists in the industry to provide a platform-agnostic system.

OBJECTS

An object of the system of the present disclosure is to provide a system that collates information present in multiple formats.

Another object of the system of the present disclosure is to provide a system that converts and presents collated multi-format information in a format desired by user.

Still another object of the system of the present disclosure is to provide a system that obtains suitable format for an unknown information format.

Other objects and advantages of the present disclosure will be more apparent from the following description when read in conjunction with the accompanying figures, which are not intended to limit the scope of the present disclosure.

SUMMARY

The present disclosure relates to a computer implemented system for collating and presenting multi-format information including information in text format, image format and video format. In an embodiment, the system comprises a memory configured to store a set of rules, and a processor configured to cooperate with the memory to receive the set of rules and generate a set of commands based on the rules. The system further comprises a transient repository to store a plurality of items of multi-format information, wherein each item of multi-format information is tagged with a client identifier. The system also comprises an input module to accept from a user, a client identifier corresponding to a client and a desired output information format type. A crawler and extractor is present in the system to crawl through the transient repository, read the tags on the items of the multi-format information and extract all the items tagged with the received client identifier. The system comprises a convertor to convert the extracted items of the multi-format information into the received desired output information format type. A collator present in the system then collates the converted items corresponding to the client identifier based on the received set of commands to obtain collated information related to the client and a display displays this collated information.

This summary is provided to introduce concepts related to collating and presenting multi-format information, which is further described below in the detailed description. This summary is neither intended to identify all the essential features of the present disclosure nor is it intended for use in determining or limiting the scope of the present disclosure.

BRIEF DESCRIPTION OF ACCOMPANYING DRAWING

Figure 2:
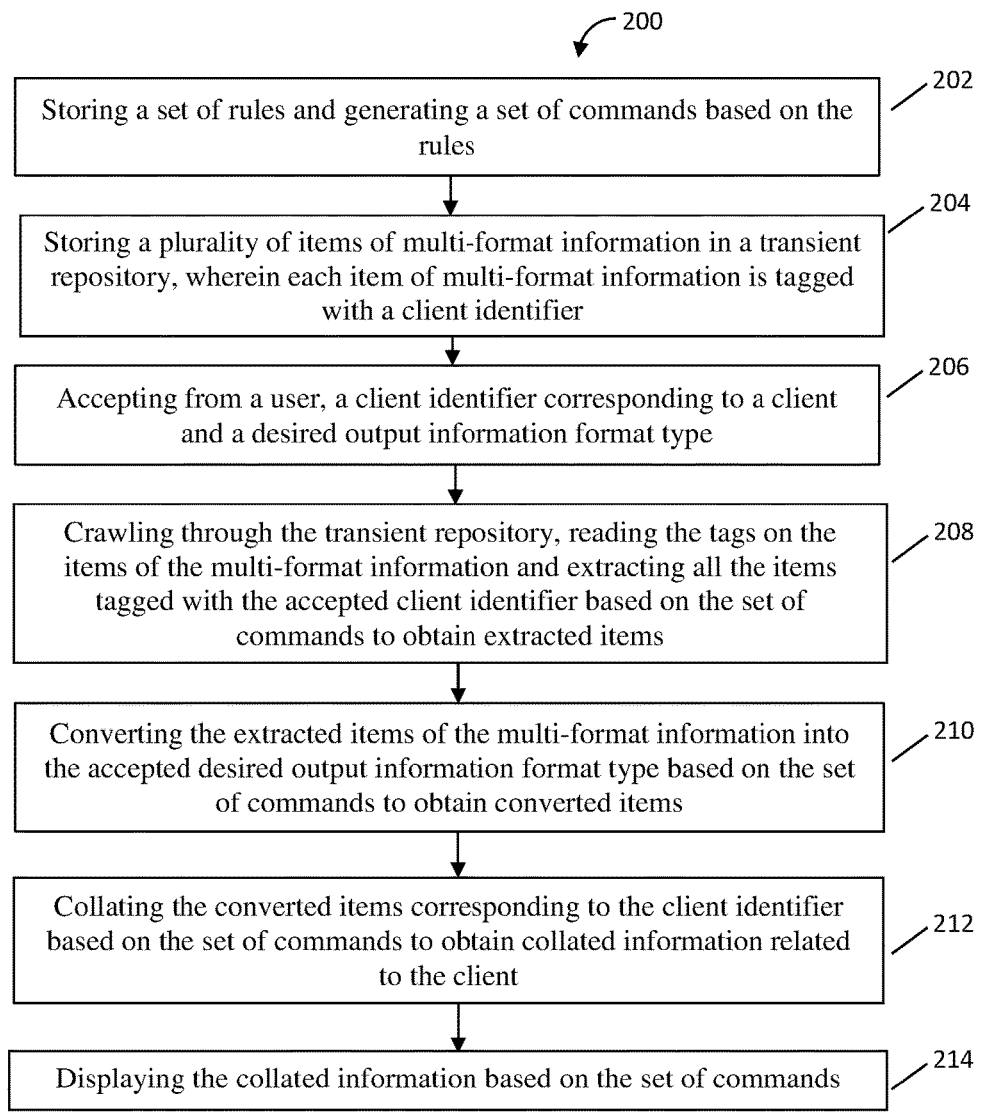

A computer implemented system and method for collating and presenting multi-format information will now be described with the help of accompanying drawing, in which:

FIG. 1 illustrates schematic of an embodiment of the system for collating and presenting multi-format information in a user-desired format; and FIG. 2 illustrates a method for collating and presenting multi-format information in a user-desired format.

DETAILED DESCRIPTION

The system of the present disclosure will now be described with reference to the embodiment shown in the accompanying drawing. The embodiment does not limit the scope and ambit of the disclosure. The description relates purely to the examples and preferred embodiments of the disclosed system and its suggested applications.

The system herein and the various features and advantageous details thereof are explained with reference to the non-limiting embodiments in the following description. Descriptions of well-known parameters and processing techniques are omitted so as to not unnecessarily obscure the embodiment herein. The examples used herein are intended merely to facilitate an understanding of ways in which the embodiment herein may be practiced and to further enable those of skill in the art to practice the embodiment herein. Accordingly, the examples should not be construed as limiting the scope of the embodiment herein.

The system of the present disclosure stores personal information of clients along with additional related information in a transient repository. The stored items of information are usually in different formats which are then converted by the system into a format desired by a user of the system or into a pre-defined format. The converted information is then collectively displayed to the user for further processing.

Referring to the accompanying drawing, FIG. 1 illustrates schematic of an embodiment of a system 100 for collating and presenting multi-format information in a user-desired format or into a pre-defined format.

The system 100 envisaged by the present disclosure comprises a memory 102 which is configured to store a set of rules. The memory 102 is coupled to a processor 104 that uses the stored set of rules to generate a set of commands which are provided to modules present in the system 100 in order to collate and present multi-format information including information in text format, image format and video format. The system 100 further comprises a transient repository 106 that stores multi-format information files/items related to clients, wherein clients refer to people whose information needs to be stored by the user for carrying out particular actions and/or for further processing. The client information files stored in the transient repository 106 are tagged with a unique client identifier/client ID that is pre-allotted to the clients. Additional information is stored in the transient repository 106 corresponding to a particular client identifier, this includes multiple items including information like client name, contact details, client identification photographs and other relevant documents and/or media files providing relevant client information. These items stored in the transient repository 106 are in different formats including but not limited to different image formats (for example JPEG, TIFF, PNG etc.), video formats (for example MPEG, 3GP, MOV etc.), PDF, DOC, XSL, HTML and the like. Different formats may also include items of information in different language formats. In one embodiment different formats include medical records like ECG, x-rays and the like. The system 100 may analyze such formats, convert them in readable formats and then store these items in the readable format in the transient repository 106.

The system 100 also comprises an input module 108 that allows a user to input a unique client identifier of a particular client whose details need to be collated in a single format for the ease of further processing. The input module 108 also accepts a desired output information format type from the user to determine a format in which the information related to the client needs to be converted. A crawler and extractor 110 present in the system 100 receives the client identifier from the input module 108 and crawls through the transient repository 106 to read the tags on the items of the stored multi-format information and extract all the items tagged with the received client identifier. These extracted items are then passed on to a convertor 112. The convertor 112 includes multiple conversion tools that allow conversion of the extracted items in either a user determined format or in a pre-determined format. The convertor 112 receives from the input module 108 the desired output information format type as given by the user and converts the extracted items of the multi-format information into the received desired output information format type. In an embodiment, the convertor 112 identifies the format of the extracted information and passes the information to correct conversion tools for conversion. For example, if the extracted information is a client photograph/image in TIFF format and the required format is a PDF format, the convertor 112 after identifying TIFF format of the image, passes the image to a 'TIFF to PDF' conversion tool included in the convertor 112. If the convertor 112 is unable to identify format of the extracted information, the system 100 notifies the client and transmits a request to the client to provide the information in an accepted format. In one embodiment, if the client cannot provide information/documents in acceptable formats, the system 100 requests the client to provide identity of the information format. The system 100 then fetches a suitable conversion tool based on the information format or requests the user to provide a suitable conversion tool.

In an embodiment, the converter 112 includes a translator (not shown in the figure) for translating the language of the related items of information into a desired language. It may happen that the clients provide relevant documents/information files which are in languages foreign to a pre-determined language set for the system 100. In such a scenario, the translator translates the language in these items of information to a suitable pre-determined language. In another embodiment, the translator requests the user to provide a desired language in which the information needs to be translated. In another embodiment the convertor 112 converts medical reports like ECG, x-rays etc. into a readable format.

On identification of the formats and necessary translations, all the information is converted in a single format and language as desired by the user. The converted items are then provided to a collator 114 that collates the converted items corresponding to the client identifier to obtain collated information related to the client and displays it on a display 116 for further processing.

The collated information may be considered to be incomplete if certain mandatory items of information or documents are absent. In one embodiment, the collator 114 includes a checker module 114a to check if the converted items comprise pre-determined mandatory information. The checker module 114a alerts the user when mandatory information is missing. The user may then take suitable action.

In an embodiment, the system 100 includes a registration module 118 configured to register a plurality of clients and accept items of multi-format information from the clients to store in the transient repository 106 on successful registration. As part of the registration process, the clients are required to specify their email ID along with a password. Post successful registration, a system generated email is sent to the clients confirming their registration. The items of information related to the registered clients are then tagged with the client identifiers and stored in the transient repository 106. In an embodiment, the system 100 also includes an intransient repository 120 which is configured to receive collated information from the collator 114 and is configured to store this collated information tagged with corresponding client identifier. In one embodiment, the intransient repository 120 stores a plurality of pre-determined points of interest and corresponding thresholds for a plurality of items of multi-format information. This is stored in form of a table of points of interests for particular information type. The multi-format information can be any type of information having pre-determined points of interest. The stored table includes threshold values for number of points of interest that must be present within particular items in order to authenticate the items. The points of interest are point features within the items which are essential in order to convert and collate the items. For example, for an image of a passport, the system 100 stores a predetermined threshold value of points of interest that must be present in any image of passport in the intransient repository 120.

In an embodiment, the system 100 includes an identifier and counter 122 which receives the extracted items from the crawler and extractor 110 and identifies points of interest within these items. The identifier and counter 122 then counts these identified points of interest to obtain interest counts corresponding to the items. The system 100 also includes an authenticator 124 to compare the obtained interest counts with the thresholds stored in the intransient repository 120 to obtain authenticated items. The authenticator 124 also checks for different points of interest, for example, if a photo on a passport is matching a stored photo, if stamps on certificates are authentic etc. The identifier and counter 122 then checks a received image of passport to determine interest count within that image and the authenticator 124 checks if the points of interest within that image satisfy the set threshold. If the image has sufficient points of interest then it is authenticated. Considering another example, in a scenario where a photograph for a visa application is submitted to the system 100 by a client for collation, there are certain guidelines and rules set by authorities of different countries for such visa photographs which must be followed. In this case, the points of interest for such documents/photographs are based on the pre-defined guidelines/rules. For example, for a visa photograph, both the ears of a person in photograph must be clearly visible, so, the points of interest in case of such a document/information include clear visibility of both ears. If other points of interest and both ears are clearly identified from the photograph, the photograph is accepted for further processing. The authenticator 124 is configured to check sufficiency/authenticity of the provided information/document. For example, if a certificate is provided by a client, the authenticator 124 performs certain checks. These checks include checking if various points of interest are present in the provided information and if those points of interest are authentic. This includes checking if a seal on the certificate is authentic, if the certificate has been signed by an authorized person and if the name of the client matches the name on the certificate. It also checks for spelling mistakes. If the name on the certificate does not match the client name, the system 100 checks if supporting documents/information is provided by client to support such discrepancy. These points of interest and rules can be pre-set or can be set by a user. In case the identified points of interest within a document/information are insufficient or not appropriate as per the set rules, the system 100 sends a request to client or the information provider to rectify the document/information. The authenticator 124 also includes a DNA authenticator 124a which is configured to authenticate items of multi-format information using DNA print matching techniques. For this, the system 100 collects DNA information of clients prior to collation and then uses the DNA matching techniques to authenticate the items.

In one embodiment, the system 100 includes an editor 126 that cooperates with the intransient repository 120 to edit the stored plurality of pre-determined thresholds. This allows the user to decide the thresholds for particular items. The threshold values are configurable as the user may decide on the severity of the item to be authenticated. It may also be dependent on application of the system 100. The user may set different levels of threshold for different types of items.

In one embodiment, the system 100 allows biometric enrolment, wherein a client's biometric details are stored in the system along with the related multi-format information. This biometric enrolment also includes a video recording feature to record client's video during the enrolment process for future authentication purposes.

The system adheres to the data protection laws mandated by the governing bodies. Certain purging guidelines may be set up by the clients or the users or may be pre-set in the system 100. These guidelines may differ from client to client. For example, some clients might want to retain their information for fewer days than the others. To achieve this, the system 100, in one embodiment, is configured to erase stored items of multi-format information from the transient repository 106 after a pre-determined duration. The system 100 is also configured to alert the user in case of a failure in the erasure routine. The causes for failure can then be identified and fixed to ensure proper functioning of the system 100.

FIG. 2 illustrates a method 200 for collating and presenting multi-format information in a user-desired format, according to an embodiment of the present disclosure. The method 200 includes steps of storing a set of rules and generating a set of commands based on the rules 202. It also includes storing a plurality of items of multi-format information in a transient repository, wherein each item of multi-format information is tagged with a client identifier 204. The method 200 further includes step of accepting from a user, a client identifier corresponding to a client and a desired output information format type 206. Once the client identifier and desired output information format type is accepted, the method 200 includes step of crawling through the transient repository, reading the tags on the items of the multi-format information and extracting all the items tagged with the accepted client identifier based on the set of commands 208. After the step of extracting, the method 200 includes converting the extracted items of the multi-format information into the accepted desired output information format type based on the set of commands to obtain converted items 210. Collating the converted items corresponding to the client identifier based on the set of commands to obtain collated information related to the client 212 is also included in the method 200 which further includes displaying the collated information based on the set of commands 214.

In one embodiment, the method 200 includes steps of registering a plurality of clients and accepting items of multi-format information from the clients to store in the transient repository on successful registration. The method 200 also includes storing in an intransient repository, the collated information tagged with corresponding client identifier and storing a plurality of pre-determined thresholds for points of interest within a plurality of items of multi-format information. Further, the method 100 includes identifying points of interest within the extracted items and counting the identified points of interest within the items to obtain interest counts corresponding to the items, comparing the stored thresholds from the intransient repository with the obtained interest counts within the extracted items to authenticate the items and editing the stored plurality of pre-determined thresholds. Further, steps of erasing stored items of multi-format information from the transient repository after a pre-determined duration, and checking that the converted items comprise pre-determined mandatory information and alerting the user when mandatory information is missing are also included. The method 200 also includes authenticating items of multi-format information using DNA print matching techniques.

TECHNICAL ADVANCEMENTS

A computer implemented system and method for collating multi-format information in accordance with the present disclosure described herein above has several technical advancements including but not limited to the realization of:
  a system that collates information present in multiple format;
  a system that collates information present in different locations remotely spaced apart from each other;
  a system that converts and presents collated multi-format information in a format desired by user; and a system that obtains suitable format for an unknown information format with the help of a user.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A computer implemented system for collating and presenting multi-format information, said multi-format information including information in text format, image format and video format, said system comprising:

a memory configured to store a set of rules;

a processor configured to cooperate with the memory to receive the set of rules and generate a set of commands based on said rules;

a transient repository coupled to the processor and configured to store a plurality of items of multi-format information, wherein each item of multi-format information is tagged with a client identifier;

an input module coupled to the processor and configured to accept from a user, a client identifier corresponding to a client and a desired output information format type;

a crawler and extractor coupled to the processor to receive the set of commands and configured to cooperate with the input module to receive the client identifier, said crawler and extractor further configured to crawl through the transient repository, read the tags on the items of the multi-format information and extract all the items tagged with the received client identifier;

an intransient repository configured to store a table containing a plurality of pre-determined points of interest within a plurality of items of multi-format information and corresponding thresholds, and further configured to store the collated information tagged with corresponding client identifier;

an identifier and counter coupled to the processor to receive the set of commands and configured to cooperate with the crawler and extractor to receive the extracted items and identify points of interest within the received extracted items, said identifier and counter further configured to count identified points of interest within said items to obtain interest counts corresponding to said items;

an authenticator coupled to the processor to receive the set of commands and configured to cooperate with the crawler and extractor to receive the extracted items, the intransient repository to receive the stored points of interest and thresholds corresponding to the extracted items, and the identifier and counter to receive the identified points of interest and interest counts corresponding to said items, said authenticator further configured to compare the stored points of interest and thresholds with the received points of interest and interest counts within the extracted items and to check if the received points of interest satisfy the thresholds to authenticate the items;

a convertor coupled to the processor to receive the set of commands and configured to cooperate with the input module to receive the desired output information format type, said convertor further configured to cooperate with the crawler and extractor to receive the extracted items, and convert the extracted items of the multi-format information into the received desired output information format type based on said received set of commands to obtain converted items;

a collator coupled to the processor to receive the set of commands and configured to cooperate with the convertor to receive the converted items, said collator further configured to collate the converted items corresponding to said client identifier based on said received set of commands to obtain collated information related to said client; and a display coupled to the processor to receive the set of commands and configured to cooperate with the collator to receive the collated information related to the client, said display further configured to display said collated information based on said received set of commands.

2. The system as claimed in claim 1, wherein said system comprises a registration module configured to register a plurality of clients and accept items of multi-format information from the clients to store in the transient repository on successful registration.

3. The system as claimed in claim 1, wherein said system is configured to check format of information provided by a client and is further configured to request the client to provide information in acceptable format if the format of provided information is not suitable.

4. The system as claimed in claim 1, wherein said system is configured to request a client to identify format of provided information and is further configured to import or accept a suitable conversion tool to convert the provided information.

5. The system as claimed in claim 1, wherein said system is configured to authenticate provided information and is further configured to request a client to provide rectified information if the information provided by the client in unsuitable.

6. The system as claimed in claim 1, wherein said system is configured to check if information provided by a client is suitable, and is further configured to check if supporting documents are provided by the client to support unsuitable information.

7. The system as claimed in claim 1, wherein said system comprises an editor configured to cooperate with the intransient repository to edit the stored plurality of pre-determined thresholds.

8. The system as claimed in claim 1, wherein said system is configured to erase stored items of multi-format information from the transient repository after a pre-determined duration.

9. The system as claimed in claim 1, wherein said collator includes a checker module configured to check that the converted items comprise pre-determined mandatory information, said checker module is further configured to alert the user when mandatory information is missing.

10. The system as claimed in claim 1, wherein said authenticator includes a DNA authenticator configured to authenticate items of multi-format information using DNA print matching techniques.

11. A computer implemented method for collating and presenting multi-format information, said multi-format information including information in text format, image format and video format said method comprising the following:

storing a set of rules and generating a set of commands based on said rules;
   storing a plurality of items of multi-format information in a transient repository, wherein each item of multi-format information is tagged with a client identifier;
   accepting from a user, a client identifier corresponding to a client and a desired output information format type;
   crawling through the transient repository, reading the tags on the items of the multi-format information and extracting all the items tagged with the accepted client identifier based on said set of commands to obtain extracted items;
   storing in an intransient repository, the collated information tagged with corresponding client identifier and storing a table containing a plurality of pre-determined points of interest within a plurality of items of multi-format information and corresponding thresholds;
   identifying points of interest within said extracted items and counting the identified points of interest within said items to obtain interest counts corresponding to said items;
   authenticating the items by comparing the stored points of interest and thresholds from the intransient repository with the identified points of interest and interest counts within the extracted items and checking if the identified points of interest satisfy the thresholds;
   converting the extracted items of the multi-format information into the accepted desired output information format type based on said set of commands to obtain converted items;
   collating the converted items corresponding to said client identifier based on said set of commands to obtain collated information related to said client; and
   displaying said collated information based on said set of commands.

12. The method as claimed in claim 11, wherein said method includes registering a plurality of clients and accepting items of multi-format information from the clients to store in the transient repository on successful registration.

13. The method as claimed in claim 11, wherein said method includes checking forms of information provided by a client and requesting the client to provide information is acceptable format if the format of provided information is not suitable.

14. The method as claimed in claim 11, wherein said method includes requesting a client to identify format of provided information and importing or accepting a suitable conversion tool to convert the provided information.

15. The method as claimed in claim 11, wherein said method includes authenticating provided information and further requesting a client to provide rectified information if the information provided by the client in unsuitable.

16. The method as claimed in claim 11, wherein said method includes checking if information provided by a client is suitable, and further checking if supporting documents are provided by the client to support unsuitable information.

17. The method as claimed in claim 11, wherein said method includes editing the stored plurality of pre-determined thresholds.

18. The method as claimed in claim 11, wherein said method includes erasing stored items of multi-format information from the transient repository after a pre-determined duration.

19. The method as claimed in claim 11, wherein said method includes checking that the converted items comprise pre-determined mandatory information and alerting the user when mandatory information is missing.

20. The method as claimed in claim 11, wherein said step of authenticating items includes authenticating items of multi-format information using DNA print matching techniques.

* * * * *